March 11, 1947. W. T. JONES 2,417,078
DISC TYPE SHELL CRACKING APPARATUS FOR COCOA BEANS
Filed Sept. 1, 1943
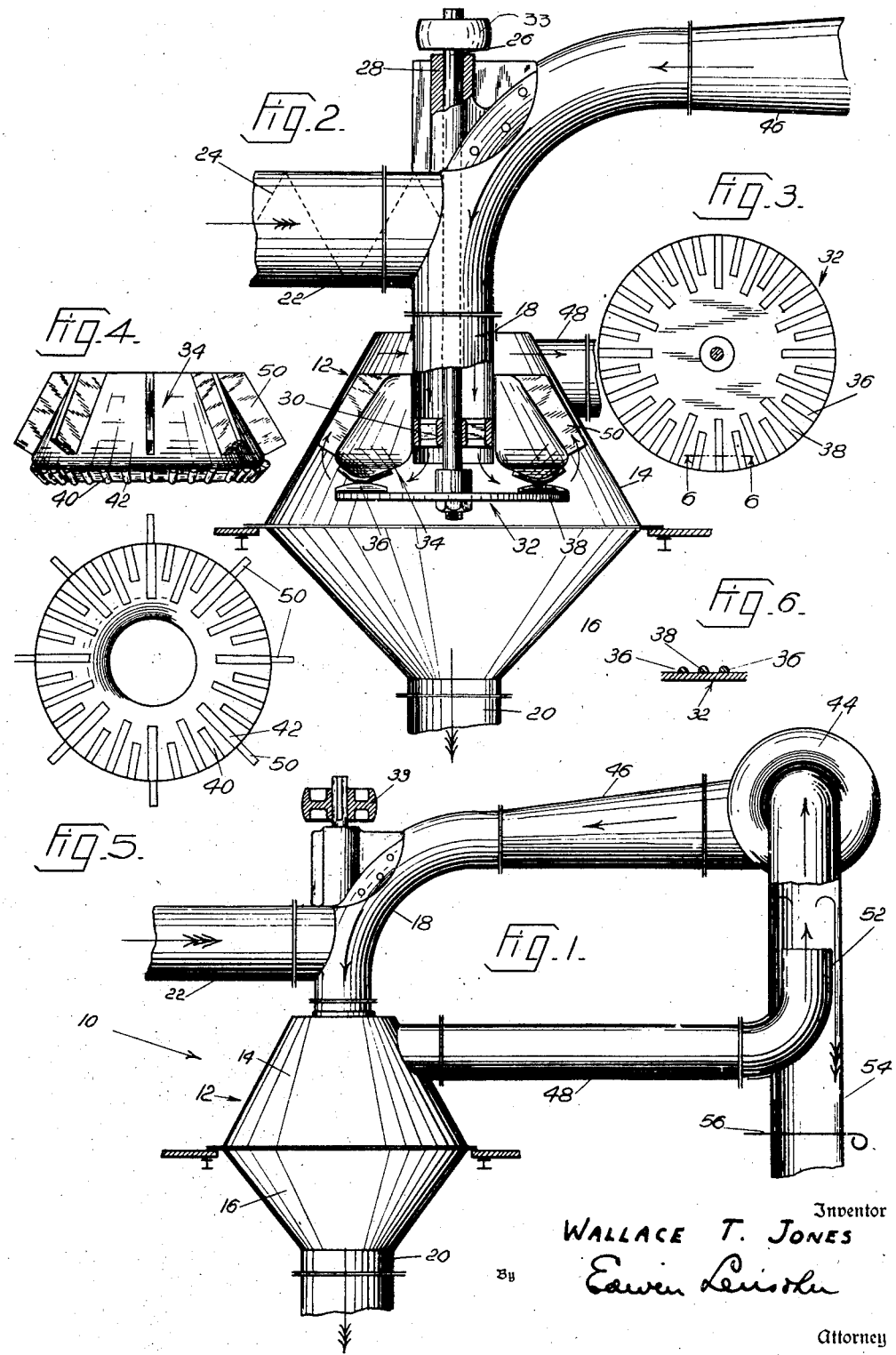
Inventor
WALLACE T. JONES
By Edwin Lewis
Attorney Patented Mar. 11, 1947

2,417,078

UNITED STATES PATENT OFFICE 2,417,078

DISC TYPE SHELL CRACKING APPARATUS FOR COCOA BEANS

Wallace T. Jones, New York, N. Y., assignor to Rockwood & Co., Brooklyn, N. Y., a corporation of Delaware Application September 1, 1943, Serial No. 500,823

4 Claims. (Cl. 241—48)

This invention relates to apparatus for cracking cocoa beans.

The primary object of this invention is the provision of apparatus operable to crack cocoa beans, preliminary to the separation of the nibs from the shells, in such manner as to substantially reduce the production of nib fines.

The above and other objects, features and advantages of the invention will be fully understood from the following description, reference being had to the accompanying illustrative drawings.

In the drawings:

Fig. 1 is a view in elevation, with a part in section, of cracking apparatus embodying the present invention;

Fig. 2 is a view, partly in elevation and partly in section, of the cracking apparatus;

Fig. 3 is a top plan view of the rotary disk of the cracking apparatus;

Fig. 4 is a view, in elevation, of the stationary head of the cracking apparatus;

Fig. 5 is a bottom view of the stationary head of the cracking apparatus;

Fig. 6 is a detail sectional view on the line 6—6 of Fig. 3.

Referring now to the drawings in detail, the cracking apparatus 10 embodying the present invention comprises a stationary casing 12 formed of the frustro-conical sections 14 and 16 connected to each other at their wider ends and provided, respectively, with an inlet tube or conduit 18 and with an outlet pipe 20, said inlet tube being connected to the outlet end of the conveyor tube 22 which conveys the beans into the cracker, tube 22 being provided with a rotary conveyor screw 24. A rotary shaft 26 is disposed within tube 18, being supported and journalled for rotation in bearings 28 and 30 fixed in said tube. A disk 32 is carried by the lower end of shaft 26 to which it is fixed for rotation therewith in casing 12. Shaft 26 for rotating disk 32 may be actuated by any suitable means, here shown as a belt operated pulley 33. A stationary head 34 is fixed to tube 18 and extends completely therearound in confronting relation to disk 32. The upper surface of rotary disk 32 is provided with a plurality of circumferentially spaced radial ribs 36 and 38 at the peripheral marginal edge of said disk. The stationary head 34 is provided at its lower end with ribs 40 and 42 which are positioned over and adjacent to the ribs on disk 32, there being sufficient clearance between the ribs of said disk and head to allow rotation of said disk in relation to said head.

An air-blower 44 has its outlet connected to tube 18 by a pipe 46 and is connected at its inlet to the upper casing part 14 by a tube 48. Said blower delivers a current of air under pressure to the inlet tube 18 of the cracking apparatus and acts in conjunction with the rotary disk 32 to move the beans through the spaces between the ribs on said disk and on head 34. More particularly, the beans supplied to the cracker through the inlet tube 18 are blown downwardly against disk 32 and are moved by said air pressure and by centrifugal force against the ribs on the disk 32 and the head 34 whereby the shells on said beans are cracked and broken and the kernels of the beans are subdivided. The vertical depth of the grooves defined by the ribs on the disk and head is somewhat larger than the thickness of the beans, and in passing through the grooves to the outlet side of the passage defined by the confronting surfaces of disk 32 and head 34, the beans in addition to being thrust against the ribs by centrifugal force and by air pressure are subjected to cracking action by the ribs, due to the relative rotary movement of said disk and head and are thereby cracked and broken. As here shown, the head 34 is provided with a plurality of stationary vanes 50 which reduce turbulence of the air flow from the outlet side of the passage between the disk and head to the inlet of blower 44. The blower 44 besides operating to deliver air under pressure into the inlet tube 18, also serves to withdraw dust formed in casing 12 during the cracking of the beans, this dust being withdrawn from said casing through tube 48 which connects to the inlet of said blower. Said tube 48 is provided with an upwardly extending part 52 disposed within and spaced from the inner surface of a dust-collecting tube 54 in which the dust collects and from which it can be removed, said tube 54 being provided with a normally closed cut-off 56.

It will be observed that, as shown in Fig. 2, the stationary ribs 40 and 42 carried by head 34 are downwardly convex in their radial direction and the movable ribs 36 and 38 carried by disk 32 are upwardly convex. Thus said stationary ribs are more widely spaced from said movable ribs at the opposite ends of the ribs than at the intermediate portions thereof, whereby the resistance to the flow of the beans through the passage defined by said disk and head is kept down so as not to interfere with the movement of the beans through said passage by the air pressure and by the centrifugal force generated by the rotation of disk 32.

It will be understood that the cocoa beans which are supplied by conveyor tube 22 to the cracking apparatus are first heated, either to roast the beans as in any suitable known roasting process, or as described in the application filed concurrently herewith by me and Benjamin J. Zenlea as joint inventors. As described in said application, the raw cocoa beans, before being delivered to the cracking apparatus, are moistened and then subjected to the action of intense heat whereby the shells of the beans are puffed away from the shell enclosed kernels or nibs of the beans, and the bean nibs or kernels retain some of the moisture previously applied to the beans before they are heated. Accordingly, in utilizing the apparatus of this invention it is preferable to treat the beans as described in said application before subjecting them to the action of this apparatus.

The operation of the apparatus is believed to be apparent from the above description, and may be summarized briefly as follows: The air stream supplied by pump 44 to tube or conduit 18 carries the beans downwardly in said conduit and propels them forcibly against the part of disk 32 which confronts the outlet end of said conduit, and the beans which strike the disk are moved by air pressure and the centrifugal force of disk 32 radially outwardly through the passage defined by the confronting portions of said disk and the head 34. In moving through said passage, the beans are subjected to a snap-cracking action by the relatively movable ribs of said disk and head. Thus, in passing from conduit 18 to the outlet side of the passage between the disk and head, the beans are subjected to the cracking action of disk 32 and to the snap-cracking action of said relatively movable ribs so that the shells are broken off and removed from the kernels of the beans and the kernels and nibs are broken into pieces small enough for further treatment in the production of chocolate while at the same time the production of excessive quantities of nib fines is avoided. The beans or parts thereof which issue from the outlet side of the passage between the disk and head drop down into the outlet pipe 20 for delivery to a separator for winnowing the nibs from the shells.

While I have shown and described the preferred embodiment of my invention, it will be understood that the latter may be embodied otherwise than as herein shown or described and that in the apparatus illustrated herein as the preferred embodiment of my invention, certain changes in the details of construction and in the arrangement of parts may be made. Acordingly, I do not wish to be limited to the invention as herein specifiically illustrated or described except to the extent which may be required by the scope of the appended claims.

Having thus described my invention, what I claim and desire to secure by Letters Patent is:

1. Apparatus for cracking cocoa beans, comprising a casing, a conduit in said casing, said casing having an inlet for the beans, said conduit being connected to said inlet and having an outlet in said casing, a disk mounted for rotation in said casing and positioned in horizontal position and in confronting relation to said outlet whereby the beans which issue from said outlet of the conduit strike said disk, means for supplying a current of air through said conduit for propelling the beans against said disk, means forming a passage located circumferentially of the disk in radially spaced relation to said outlet of said conduit, means for rotating said disk whereby the beans which strike said disk are propelled by centrifugal force through said passage, and means in said passage for engaging and breaking the beans, said air-current supplying means comprising an air pump having its outlet connected to said conduit and its inlet connected to said casing above said disk at the outlet side of said passage for withdrawing the lighter cracked cocoa-bean particles from said casing, said casing having a passage below said disk in communication with said first mentioned passage of the outlet side thereof to provide for the discharge of the heavier cracked cocoa-bean particles from the casing, and a separator between said pump inlet and the outlet side of said passage for separating broken bean particles from the air current passing from said casing to said air pump inlet.

2. Apparatus for cracking cocoa beans, comprising a casing, a conduit in said casing, said casing having an inlet for the beans, said conduit being connected to said inlet and having an outlet in said casing, a disk mounted for rotation in said casing and positioned in confronting relation to said outlet whereby the beans which issue from said outlet of the conduit strike said disk, and a stationary head in said casing having a circumferentially extending part confronting said disk in spaced relation thereto and forming therewith a passage located circumferentially of the disk in radially spaced relation to said outlet of said conduit, and means for rotating said disk whereby the beans which strike said disk are propelled by centrifugal force through said passage, circumferentially spaced members on said disk and on said circumferentially extending part of said head, said disk members on said disk being sufficiently close to said members on said head to engage and break the beans during their movement through said passage means for providing an air stream flowing upwardly in said casing from the outer ends of said disk and head members, and circumferentially spaced vanes carried by said head for directing the air stream upwardly in the casing.

3. In apparatus for cracking cocoa beans, a casing, a rotary disk in said casing, means for discharging beans against the surface of said disk inwardly of the peripheral marginal part of said surface whereby the beans which are discharged against said surface are propelled by the centrifugal force of the rotary disk toward the periphery of the latter, ribs carried by said disk and disposed on said peripheral marginal part of said disk surface and extending radially thereof in circumferentially spaced relation, and radially extending ribs mounted in said casing in circumferentially spaced relation therein and above said disk-ribs in relatively movable relation to the latter, the opposite ends of said disk-ribs diverging from the adjacent opposite ends, respectively, of said other ribs and the intermediate portions of said disk-ribs being sufficiently close to the intermediate portions of said other ribs to engage and break the beans while the latter are propelled between the relatively movable ribs by the centrifugal force of said disk.

4. Apparatus for cracking cocoa beans, comprising a casing, a conduit in said casing, said casing having an inlet for the beans, said conduit being connected to said inlet and having an outlet in said casing, a disk mounted in horizontal position for rotation in said casing and positioned in confronting relation to said outlet whereby the beans which issue from said outlet of the conduit strike said disk, a stationary head mounted on and surrounding said conduit in said casing and having a circumferentially extending part confronting said disk in spaced relation thereto and forming therewith a passage located circumferentially of the disk in radially spaced relation to said outlet of said conduit, means for rotating said disk whereby the beans which strike said disk are propelled by centrifugal force through said passage, circumferentially spaced members on said disk and on said circumferentially extending part of said head, said disk members on said disk being sufficiently close to said members on said head to engage and break the beans during their movement through said passage, a suction air pump having its inlet connected to said casing at the outlet side of said passage above said disk for exhausting the lighter cracked cocoa-bean particles from the casing while the heavier cocoa-bean particles pass downwardly by gravity from the outlet end of said passage for discharge from said casing, and radially extending vanes on said head in circumferentially spaced relation for directing the air flow upwardly from said outlet side of said passage.

WALLACE T. JONES.

REFERENCES CITED

The following references are of record in the file of this patent:

UNITED STATES PATENTS

| Number | Name | Date |
|---|---|---|
| 2,108,609 | O'Mara | Feb. 15, 1938 |
| 1,561,031 | Simpson | Nov. 10, 1925 |
| 2,171,100 | Sakurai | Aug. 29, 1939 |
| 1,116,777 | Williams | Nov. 10, 1914 |
| 1,920,117 | Tenney | July 25, 1933 |
| 917,016 | Davidson | Apr. 6, 1909 |
| 668,287 | Frey | Feb. 19, 1901 |
| 251,803 | Starkey | Jan. 3, 1882 |
| 994,596 | Marks | June 6, 1911 |
| 1,729,905 | Voigt | Oct. 1, 1929 |
| 582,873 | Nilsson et al. | May 18, 1897 |
| 1,228,338 | Marks | May 29, 1917 |
| 1,484,208 | Davis | Feb. 19, 1924 |

FOREIGN PATENTS

| Number | Country | Date |
|---|---|---|
| 416,521 | British | Sept. 17, 1934 |
| 3,306 | British | 1898 |
| 453,101 | French | Mar. 26, 1913 |
| 117,220 | Australia | July 1, 1943 |
| 3,831 | British | 1904 |
| 5,858 | British | 1891 |